(12) United States Patent
Koker et al.

(10) Patent No.: US 9,612,833 B2
(45) Date of Patent: Apr. 4, 2017

(54) HANDLING COMPRESSED DATA OVER DISTRIBUTED CACHE FABRIC

(71) Applicant: Intel Corporation, Santa Clara, CA (US)

(72) Inventors: Altug Koker, El Dorado Hills, CA (US); Hong Jiang, El Dorado Hills, CA (US); James M. Holland, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 272 days.

(21) Appl. No.: 14/193,550

(22) Filed: Feb. 28, 2014

(65) Prior Publication Data

US 2015/0248292 A1    Sep. 3, 2015

(51) Int. Cl.
| | | |
|---|---|---|
| *G06F 12/08* | (2016.01) | |
| *G06F 9/312* | (2006.01) | |
| *G06F 9/30* | (2006.01) | |
| *G06F 12/0875* | (2016.01) | |
| *G06F 12/0813* | (2016.01) | |
| *G06F 12/0815* | (2016.01) | |
| *G06F 12/0842* | (2016.01) | |

(52) U.S. Cl.
CPC ...... *G06F 9/30043* (2013.01); *G06F 12/0813* (2013.01); *G06F 12/0815* (2013.01); *G06F 12/0842* (2013.01); *G06F 12/0875* (2013.01); G06F 2212/1016 (2013.01); G06F 2212/1028 (2013.01); G06F 2212/401 (2013.01); Y02B 60/1225 (2013.01)

(58) Field of Classification Search
CPC ............ G06F 9/30043; G06F 12/0813; G06F 12/0815; G06F 12/0842; G06F 2212/401
See application file for complete search history.

(56) References Cited

U.S. PATENT DOCUMENTS

| | | | | |
|---|---|---|---|---|
| 2004/0093465 | A1* | 5/2004 | Ramchandran | G06F 9/30014 711/131 |
| 2005/0144387 | A1* | 6/2005 | Adl-Tabatabai | G06F 12/0862 711/118 |
| 2005/0268046 | A1* | 12/2005 | Heil | G06F 12/0862 711/137 |
| 2013/0262538 | A1* | 10/2013 | Wegener | G06F 13/28 708/203 |

(Continued)

*Primary Examiner* — Hal Schnee
(74) *Attorney, Agent, or Firm* — Garrett IP, LLC

(57) ABSTRACT

Technologies are presented that optimize data processing cost and efficiency. A computing system may comprise at least one processing element; a memory communicatively coupled to the at least one processing element; at least one compressor-decompressor communicatively coupled to the at least one processing element, and communicatively coupled to the memory through a memory interface; and a cache fabric comprising a plurality of distributed cache banks communicatively coupled to each other, to the at least one processing element, and to the at least one compressor-decompressor via a plurality of nodes. In this system, the at least one compressor-decompressor and the cache fabric are configured to manage and track uncompressed data of variable length for data requests by the processing element(s), allowing usage of compressed data in the memory.

18 Claims, 9 Drawing Sheets

(56) References Cited

U.S. PATENT DOCUMENTS

2014/0118364 A1* 5/2014 Hakura .................. G06T 11/40
                                                                                     345/505
2015/0169459 A1* 6/2015 Huang ................ G06F 12/0864
                                                                                     711/128

* cited by examiner

HANDLING COMPRESSED DATA OVER DISTRIBUTED CACHE FABRIC

TECHNICAL FIELD

The technologies described herein generally relate to data storage and retrieval in a computing system.

BACKGROUND

In data processing, one challenge is optimizing the use of memory bandwidth and power while minimizing processing time. One way to optimize the use of memory is to compress the data before storing in memory. Known computing systems include costly compression/decompression elements in their processing blocks, while other known systems minimize cost by not taking advantage of compression at all.

BRIEF DESCRIPTION OF THE DRAWINGS/FIGURES

Figure 1:
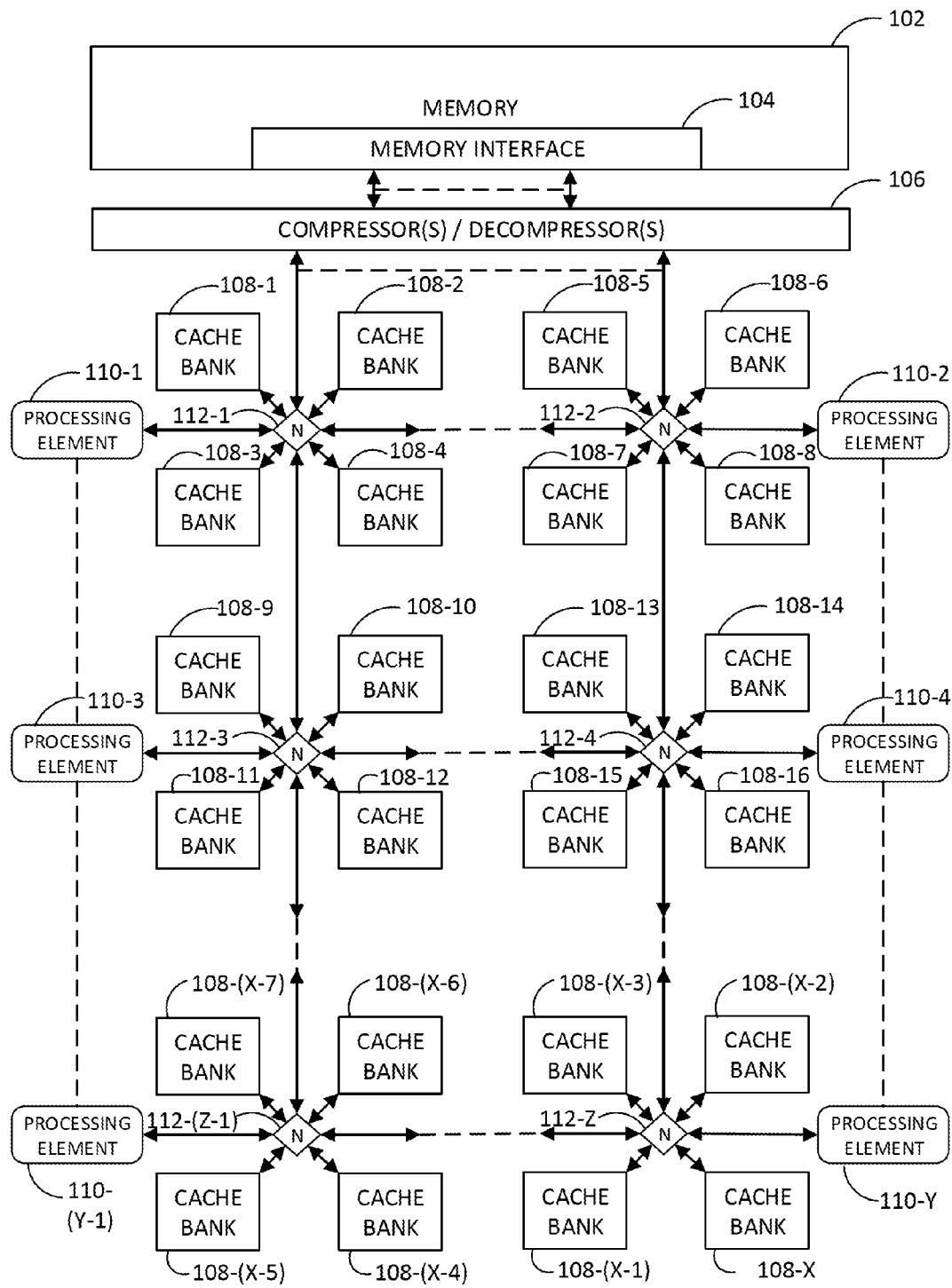
FIG. 1 is a block diagram of a memory/cache structure, according to an embodiment.

In the drawings, the leftmost digit(s) of a reference number may identify the drawing in which the reference number first appears.

DETAILED DESCRIPTION

Computing systems that take advantage of compressed data in memory are presented with unique challenges when it comes to maintaining the data in both compressed and decompressed form. Known computing systems either avoid these challenges by not taking advantage of compression at all or include costly compression/decompression elements into their processing blocks. In either known case, there are diminishing returns with regard to power and area consumption.

A specific challenge with using compressed data is how to handle variable length compression and decompression of data on a distributed cache hierarchy that holds uncompressed data structures. In handling variable length data compression/decompression over a distributed cache architecture, the various pieces of data when uncompressed may be scattered around a large cache fabric having multiple physical cache banks. Each piece of data may become disjointed with respect to other pieces and would need to be tracked. When it is necessary to write data from the cache fabric to memory, each piece may be gathered, consolidated, and compressed. The solutions described herein provide for efficiently maintaining uncompressed data over a distributed cache fabric. For example, with these solutions, allocations may be accomplished as a back-fill post decompression for LOAD operations. For STORE operations, compression may take place when a single piece of data gets evicted from a cache bank of the cache fabric. These operations are described in more detail below.

FIG. 1 is a block diagram of a memory/cache structure, according to an embodiment. The memory/cache structure of FIG. 1 may include a memory 102 having a memory interface 104, a compressor-decompressor unit 106, and a cache fabric 108 that may include a plurality of cache banks 108-1 to 108-X. The cache banks 108-1 to 108-X may be communicatively coupled to each other, to the compressor-decompressor unit 106, and to one or more processing elements or engines 110-1 to 110-Y (collectively, 110) (e.g., but not to be limited to, graphics processing elements) via communication nodes 112-1 to 112-Z (collectively, 112). Communication nodes 112 connect independent physical entities to form a single logical view and provide a communication channel for those entities. In the embodiment shown in FIG. 1, there are four cache banks directly connected to each node 112. However, this configuration is only an example and it is not to be limiting. Other configurations of cache banks and nodes may also be contemplated.

Memory 102 may be implemented, for example, as a volatile memory device such as, but not limited to, a Random Access Memory (RAM), Dynamic Random Access Memory (DRAM), Static RAM (SRAM), etc., including currently developing and future types of memory. Memory 102 may hold data that is compressed or not compressed. However, the embodiments discussed herein primarily involve dealing with compressed memory data.

Compressor-decompressor unit 106 may include at least one compressor-decompressor that may compress data from the cache fabric 108 prior to providing the compressed data to memory 102, and may decompress data provided from memory 102 prior to providing the decompressed data to cache fabric 108. In an embodiment, compressor-decompressor unit 106 may include one compressor-decompressor per memory channel, but is not to be limited to this configuration, as a plurality of compressor-decompressor pairs may be used. The placement of the compressor-decompressor unit 106 on the way to and from memory 102 from the cache fabric 108 (e.g., as opposed to having a compressor-decompressor at each processing block) will allow for maximization of a reduction in power usage on the memory interface 104, while keeping the cost of area at a minimum as the cache fabric 108 scales to handle various process requests. The placement of the compressor-decompressor 106 puts these potential costs only toward the memory interface 104 where most power gains are observed. However, this type of implementation presents the issue of how to handle distributed data and compression/decompression over a vast cache fabric with multiple physical cache banks. The length of compression may be any number of bytes, and respective cache entries may be represented by any number of bytes. Thus, a single compressed memory entry may distribute to multiple cache bank locations when in uncompressed format. When cache misses occur, decompressed pieces of data need to be allocated to one or more (potentially many) cache banks (e.g., a LOAD operation). Similarly, when data is to be written to memory, compressible pieces of data may be distributed over the cache fabric and would need to be gathered toward memory (e.g., a STORE operation).

Figure 2:
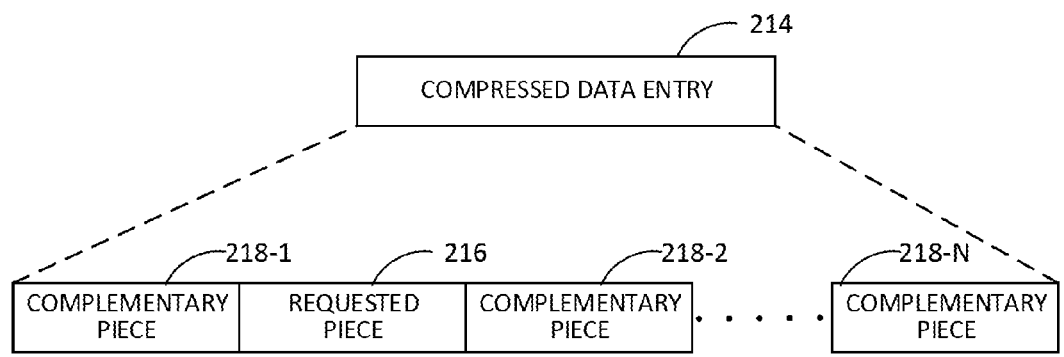
FIG. 2 is a block diagram showing components of a compressed data entry in memory, once decompressed, according to an embodiment.

In an embodiment, if a particular access on a processing element's 110 (e.g., a GPU's) cache fabric misses the contents from the cache, one solution involves the contents compressed data from memory to be back-filled to multiple physical cache blocks not only for the requested piece of data, but also for complementary pieces. In this situation, the processing element 110 may generate a LOAD request to the memory 102. The compressor-decompressor unit 106 may detect the compressible stream LOAD request and on the way back from memory 102, the compressor-decompressor unit 106 will decompress the contents. The compressor-decompressor unit 106 may identify the contents requested in the original request (which may be a subset of the decompressed contents), and provide the requested contents to a cache bank of the cache fabric 108, from where it may be provided to the requesting processing element 110. The compressor-decompressor unit 106 may also identify complementary pieces of data, which are the pieces of data from the decompressed contents that were not a part of the requested contents. For example, as shown in FIG. 2, a compressed data entry 214, that may be decompressed upon a LOAD request, may include, when decompressed, a requested piece of data 216 and complementary pieces of data 218-1 to 218-N (collectively, 218). The compressor-decompressor unit 106 may provide these complementary pieces 218 to one or more cache banks of cache fabric 108 to create back-fills into the cache. With a back-fill, data is placed into one or more cache banks of cache fabric 108 if there is bandwidth, but may otherwise be discarded. These complementary pieces 218 were not a part of the original LOAD request, but may be needed for potential future demand. In an embodiment, given these complementary pieces 218 are not actively needed, they may have a lower priority for being in the cache fabric 108 as compared to actual data requests (e.g., just-in-time data requests). For example, if bandwidth in cache fabric 108 is limited, a complementary piece of data 218 may be replaced by a future requested piece of data.

Due to the close temporal nature of sequential demand of data entries (e.g., such as with graphics and/or media applications), it is possible that, as an original data request is in process, demand for its complementary pieces of data will occur before the back-fill operation is completed. In embodiments, the cache banks of cache fabric 108 and the compressor-decompressor unit 106 may each (independently or together) resolve this situation. For example, in an embodiment, if a back-fill of complementary pieces of data 218 has already been provided to a cache bank of cache fabric 108 and is in queue for the back-fill, that particular cache bank may detect a matching demand LOAD request and fulfill it without going through the memory. Each back-fill operation may have a completion task back to the compressor-decompressor unit 106 to detect potential demand requests. Similarly, in an embodiment, compressor-decompressor unit 106 may include tracking logic for future LOAD requests for one or more complementary pieces 218 for when the original data request or the complementary back-fill is still in process. In this situation, compressor-decompressor unit 106 may cancel LOADS to memory for complementary pieces of data to avoid additional traffic on the memory interface 104.

A STORE operation occurs when data is to be written to memory 102. STOREs to compressed memory surfaces may present additional issues to address. A processing element 110 may keep the sequential data pieces of compressed entries as intact as possible as it writes data out to cache fabric 108. Similar to LOAD operations, these STORE operations may have close proximity in temporal order as the data gets written out from the registers of the processing element 110. Cache fabric 108 may distribute these written out pieces of data over many cache banks. These written out pieces of data in the cache fabric may be considered "modified content". In an embodiment, when any of these pieces of "modified content" get evicted (i.e., written out) from its respective cache bank, compressor-decompressor unit 106 may detect that a piece of "modified content" is being written to a compressed memory surface. The compressor-decompressor unit 106 may pull this compressible "modified content" aside and conduct a search (e.g., by generating "snoops") of cache fabric 108 for the complementary pieces associated with the "modified content". If all the complementary pieces are found, the "modified content" and the associated complementary pieces may be consolidated (e.g., in order), compressed, and written to memory 102. In an embodiment, the contents of the cache banks that continue to hold the complementary pieces are downgraded to a status of "non-modified".

In an embodiment, in the STORE operation described above, if not all of the complementary pieces are found in the cache fabric 108 (e.g., if any of the "snoops" comes back as a MISS), the STORE operation may be handled like a partial update to a compressed buffer. The compressor-decompressor unit 106 may read previously stored compressed content from memory 102 that is associated with the "modified content", decompress the associated content, and merge the associated content with the "modified content" and the found complementary pieces to complete the full data set. The complete data set may then be compressed and written to memory 102.

In another embodiment, a STORE operation may be executed bypassing the cache fabric 108, keeping the data intact all the way from the processing elements 110 to the compressor-decompressor unit 106 to be compressed and written to memory 102. In some usage models, where there may not be immediate demand for compressed data, the use of cache as immediate storage brings overhead (e.g., extra snooping, storage space, etc.). However, if there is a usage model (e.g., certain applications) that demand the data STOREs to be available for future LOAD operations within the cache fabric, compressor-decompressor unit 106 may also back-fill the data to the cache fabric. This may be implemented using a software control defined based on usage case. In this embodiment, the cache fabric 108 may be used as a write buffer, and snoops may be generated to find needed data. This embodiment may require a large write buffer.

Figure 3:
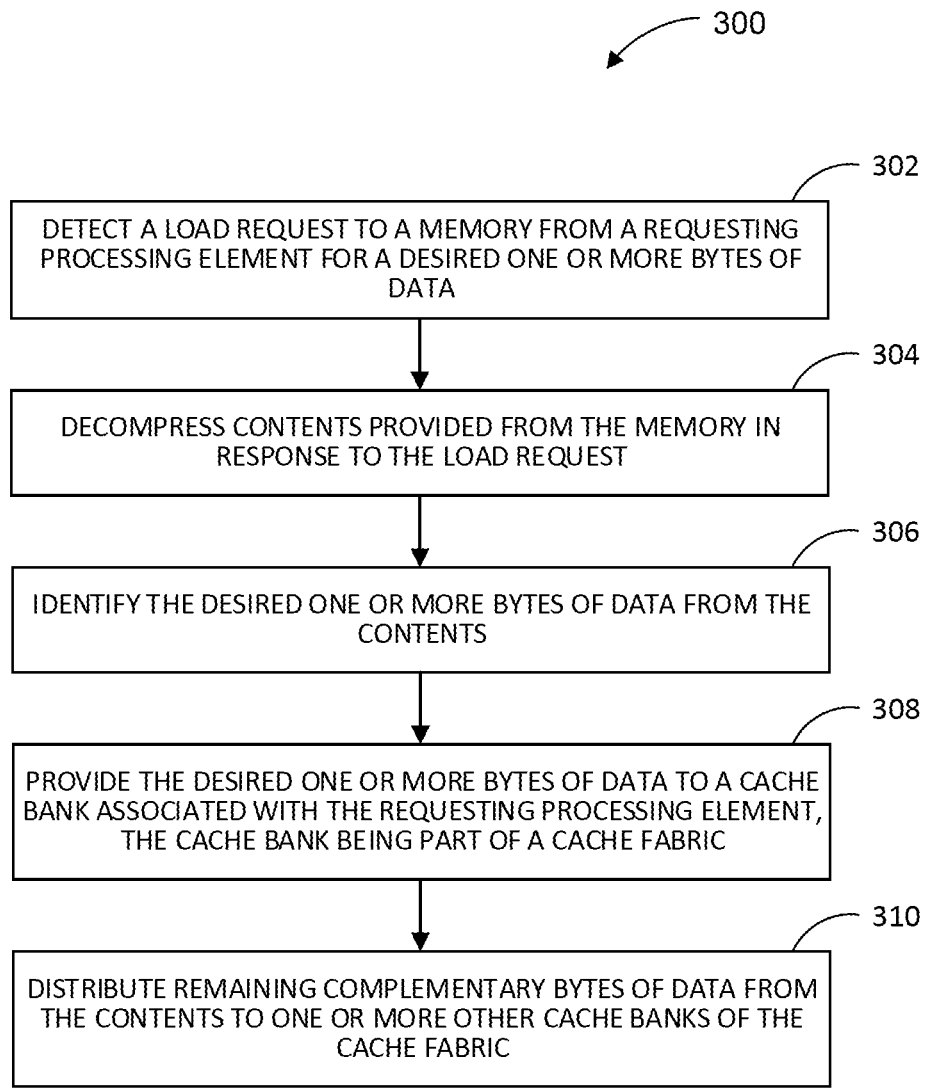
FIG. 3 is an example flow chart depicting a LOAD operation, according to an embodiment.

FIG. 3 depicts an example flow chart depicting a LOAD operation 300, according to an embodiment. LOAD operation 300 is an example of a LOAD operation discussed above. LOAD operation 300 is from the perspective of a compressor-decompressor, such as compressor/decompressor unit 106 of FIG. 1. At 302, a LOAD request to a memory from a requesting processing element may be detected for a desired one or more bytes of data. At 304, contents provided from the memory in response to the LOAD request may be decompressed. At 306, the desired one or more bytes of data may be identified from the decompressed contents. At 308, the desired one or more bytes of data may be provided to a cache bank associated with the requesting processing element. The cache bank may be a part of a cache fabric made up of a plurality of cache banks, such as cache fabric 108 shown in FIG. 1. At 310, complementary bytes of data from the contents may be distributed to one or more other cache banks of the cache fabric. The complementary bytes of data distributed to the other cache banks may be used for future data requests (e.g., future LOAD or STORE operations).

Figure 4:
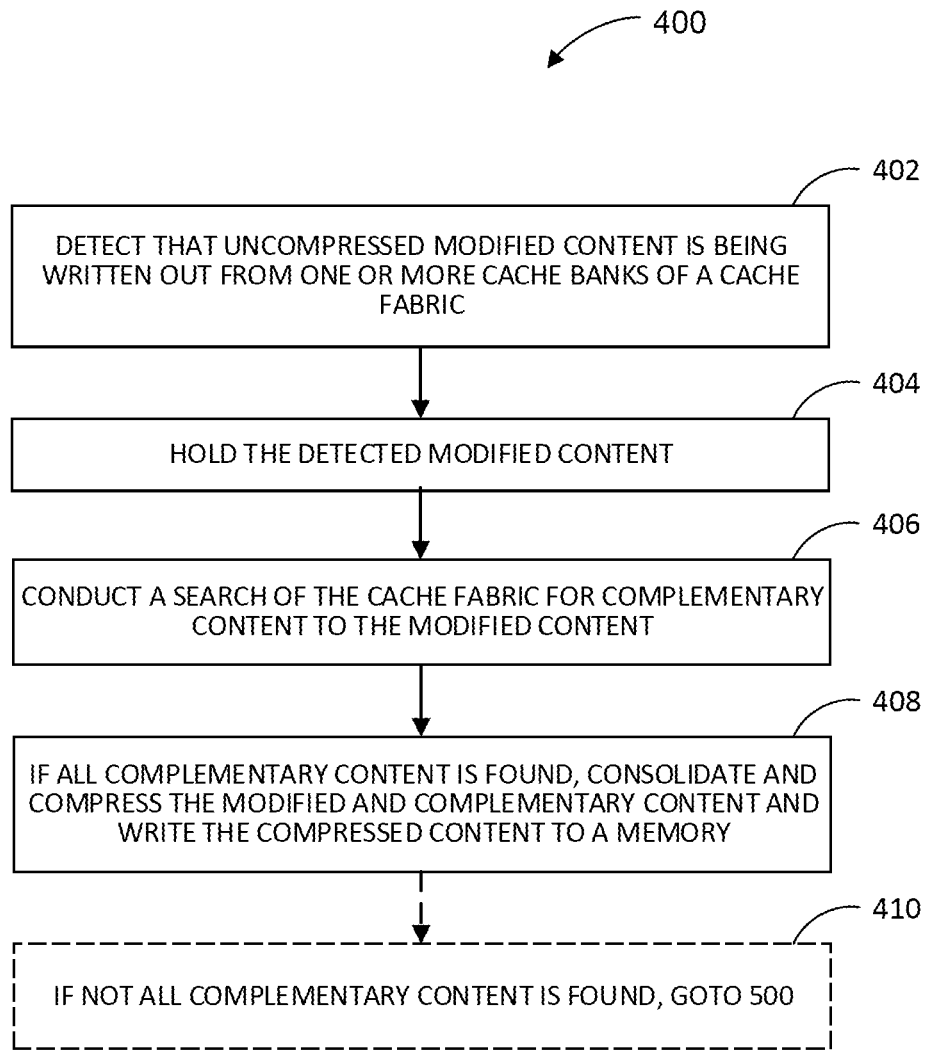
FIGS. 4 and 5 are example flow charts depicting a STORE operation, according to embodiments.

FIG. 4 is an example flow chart depicting a STORE operation 400, according to embodiments. STORE operation 400 is an example of a STORE operation discussed above. STORE operation 400 is from the perspective of a compressor-decompressor, such as compressor/decompressor unit 106 of FIG. 1. At 402, uncompressed modified content being written out from one or more cache banks of a cache fabric, such as cache fabric 108, may be detected. At 404, the detected modified content is held (e.g., instead of going straight to memory). At 406, a search of the cache fabric may be conducted for complementary content to the modified content. At 408, if all complementary content is found, the modified and complementary content may be consolidated, compressed, and written to memory. At 410, if not all complementary content is found, processing may continue at process 500 of FIG. 5.

Figure 5:
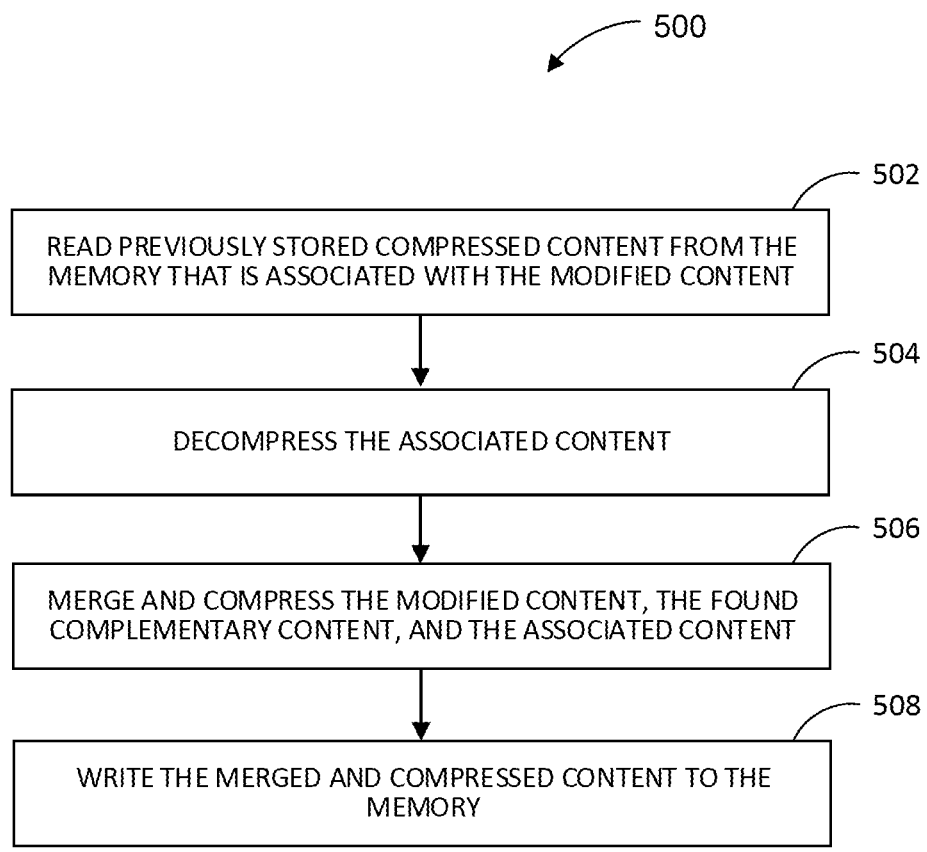

FIG. 5 is an example flow chart depicting a continuing STORE operation 500, according to an embodiment. STORE operation 500 is an example of a STORE operation discussed above. STORE operation 500 is from the perspective of a compressor-decompressor, such as compressor/decompressor unit 106 of FIG. 1, and is carried out if not all complementary content is found in 408 of STORE operation 400. At 502, previously stored compressed content associated with the modified content may be read from memory. At 504, the associated content may be decompressed. At 506, the modified content, the found complementary content, and the associated content may be merged and compressed. At 508, the merged and compressed content may be written to memory.

Figure 6:
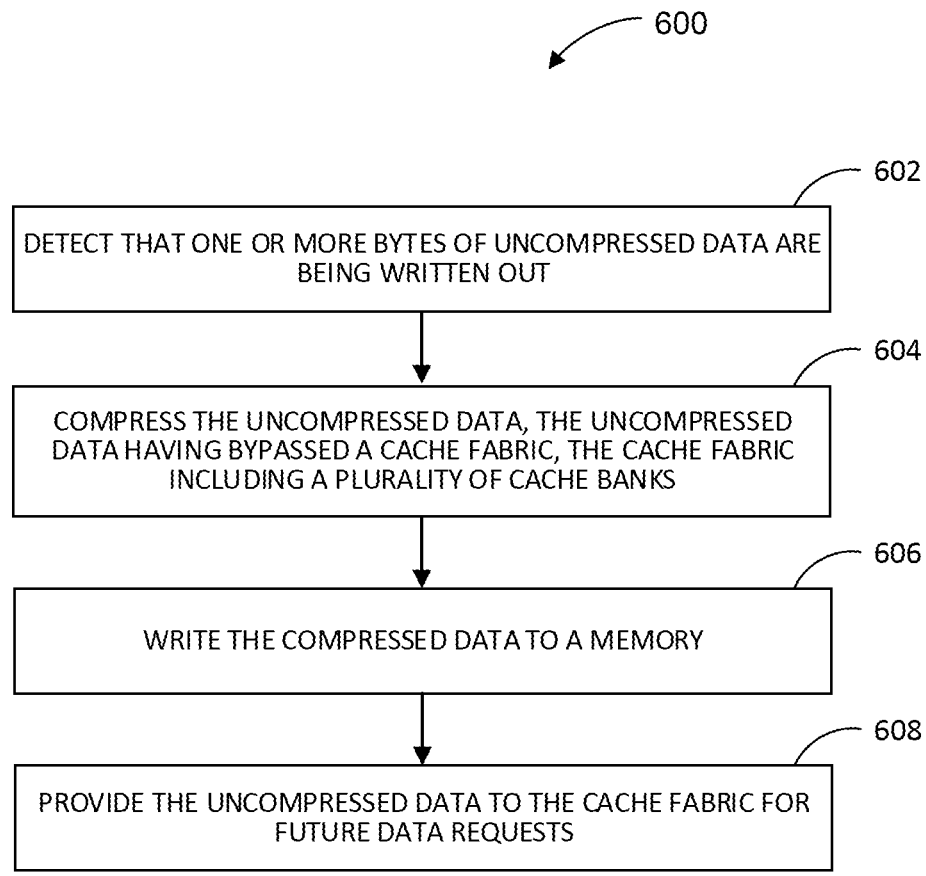
FIG. 6 is an example flow chart depicting a STORE operation, according to an embodiment.

FIG. 6 is an example flow chart depicting a STORE operation 600, according to an embodiment. STORE operation 600 is an example of another STORE operation discussed above. STORE operation 600 is from the perspective of a compressor-decompressor, such as compressor/decompressor unit 106 of FIG. 1. At 602, it may be detected that one or more bytes of uncompressed data are being written out. At 604, the uncompressed data may be compressed, bypassing a cache fabric of a plurality of cache banks. At 606, the compressed data may be written to memory. At 608, the uncompressed data may be provided to the cache fabric for future data requests.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The terms software and firmware, as used herein, refer to a computer program product including at least one computer readable medium having computer program logic, such as computer-executable instructions, stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, SRAM, DRAM, a hard drive, a solid state drive, or other data storage device.

Figure 7:
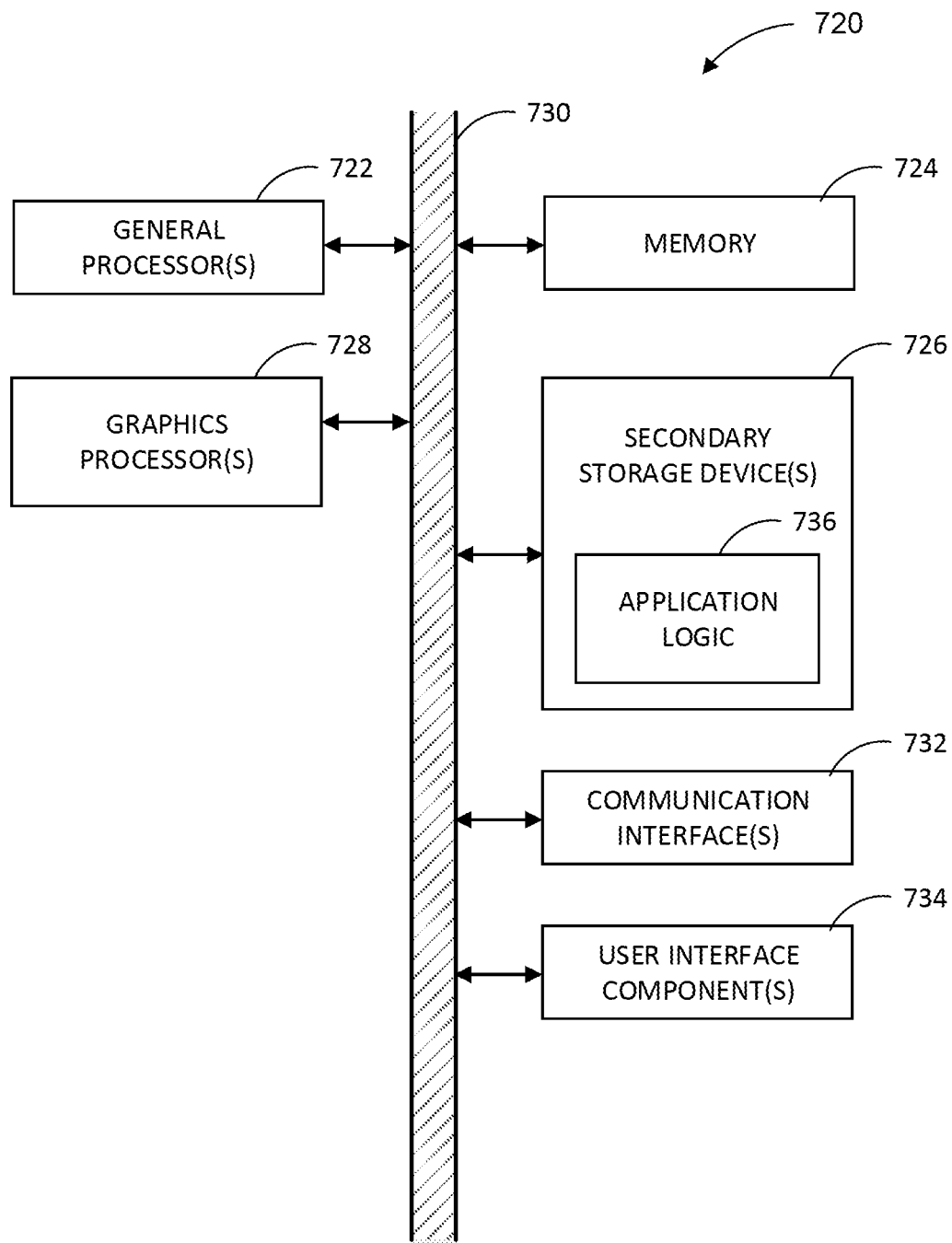
FIG. 7 is a block diagram of an example computing device, according to an embodiment.

As stated above, in embodiments, some or all of the processing described herein may be implemented as hardware, software, and/or firmware. Such embodiments may be illustrated in the context of an example computing system 720 as shown in FIG. 7. Computing system 720 may include one or more central processing unit(s) (CPU), such as one or more general processors 722, connected to memory 724, one or more secondary storage devices 726, and one or more graphics processors 728 by a link 730 or similar mechanism. Alternatively, graphics processor(s) 728 may be integrated with general processor(s) 722. Graphics processor(s) 728 may include one or more logic units for carrying out the methods described herein. In embodiments, other logic units may also be present. One skilled in the art would recognize that the functions of the logic units may be executed by a single logic unit, or any number of logic units. Computing system 720 may optionally include communication interface(s) 732 and/or user interface components 734. The communication interface(s) 732 may be implemented in hardware or a combination of hardware and software, and may provide a wired or wireless network interface to a network. The user interface components 734 may include, for example, a touchscreen, a display, one or more user input components (e.g., a keyboard, a mouse, etc.), a speaker, or the like, or any combination thereof. Data and/or graphics processed via the methods described herein may be displayed on one or more user interface components. The one or more secondary storage devices 726 may be, for example, one or more hard drives or the like, and may store logic 736 (e.g., application logic) to be executed by graphics processor(s) 728 and/or general processor(s) 722. In an embodiment, general processor(s) 722 and/or graphics processor(s) 728 may be microprocessors, and logic 736 may be stored or loaded into memory 724 for execution by general processor(s) 722 and/or graphics processor(s) 728 to provide the functions described herein. Note that while not shown, computing system 720 may include additional components.

Figure 8:
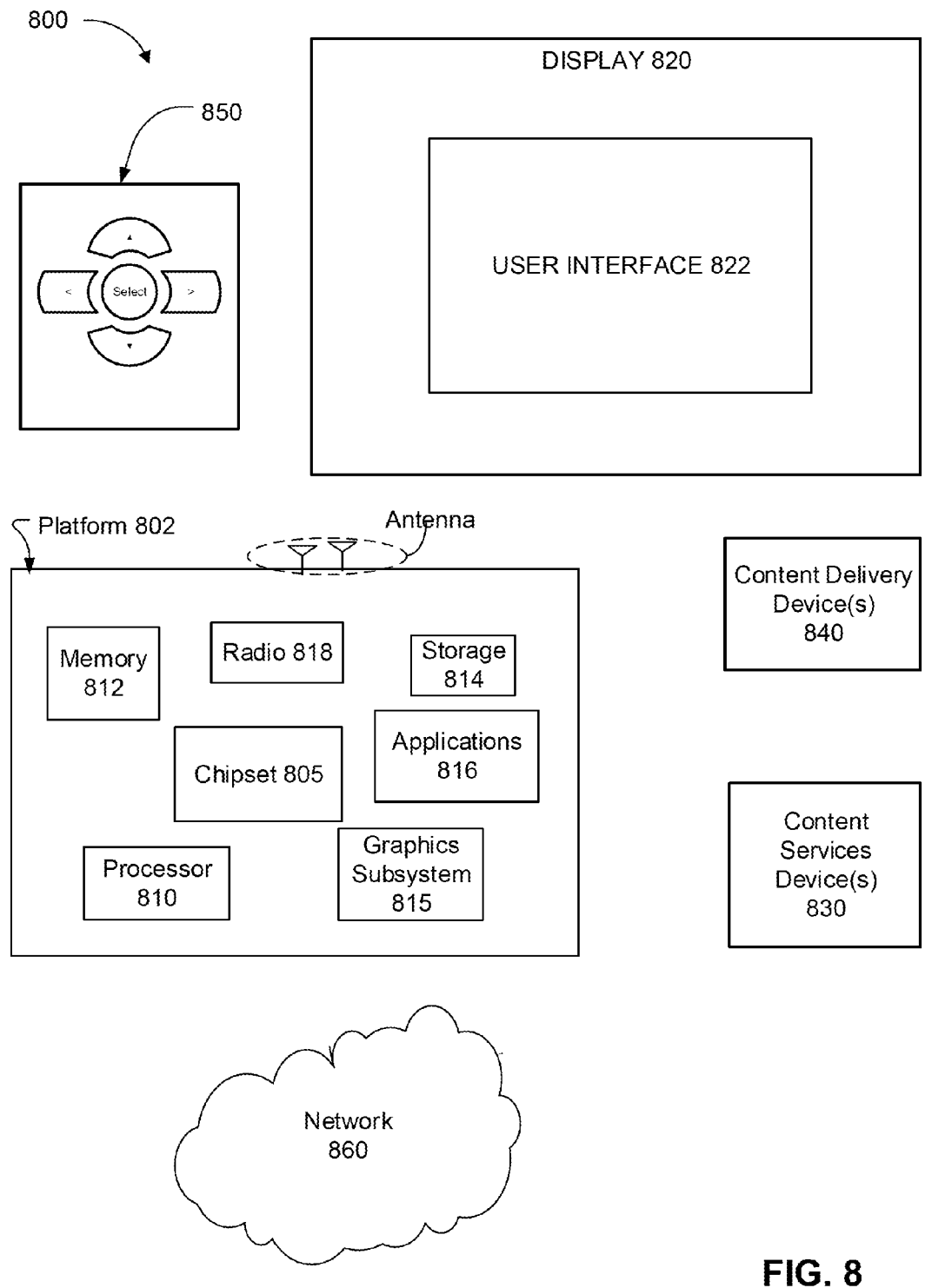
FIG. 8 illustrates an example information system in which an embodiment may be implemented.

The technology described above may be a part of a larger information system. FIG. 8 illustrates such an embodiment, as a system 800. In embodiments, system 800 may be a media system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 800 comprises a platform 802 coupled to a display 820. Platform 802 may receive content from a content device such as content services device(s) 830 or content delivery device(s) 840 or other similar content sources. A navigation controller 850 comprising one or more navigation features may be used to interact with, for example, platform 802 and/or display 820. Each of these components is described in more detail below.

In embodiments, platform 802 may comprise any combination of a chipset 805, processor 810, memory 812, storage 814, graphics subsystem 815, applications 816 and/or radio 818. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 810 may comprise dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 814 may comprise technology to increase the storage performance enhanced protection for valuable digital media when multiple hard drives are included, for example.

Graphics subsystem 815 may perform processing of images such as still or video for display. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, DisplayPort, wireless HDMI, and/or wireless HD compliant techniques. Graphics subsystem 815 could be integrated into processor 810 or chipset 805. Graphics subsystem 815 could be a stand-alone card communicatively coupled to chipset 805.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 818 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area networks (WMANs), cellular networks, and satellite networks. In communicating across such networks, radio 818 may operate in accordance with one or more applicable standards in any version.

In embodiments, display 820 may comprise any television type monitor or display. Display 820 may comprise, for example, a computer display screen, touch screen display, video monitor, television-like device, and/or a television. Display 820 may be digital and/or analog. In embodiments, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In embodiments, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In embodiments, content services device(s) 830 may comprise a cable television box, personal computer, network, telephone, Internet enabled devices or appliance capable of delivering digital information and/or content, and any other similar device capable of unidirectionally or bidirectionally communicating content between content providers and platform 802 and/display 820, via network 860 or directly. It will be appreciated that the content may be communicated unidirectionally and/or bidirectionally to and from any one of the components in system 800 and a content provider via network 860. Examples of content may include any media information including, for example, video, music, medical and gaming information, and so forth.

Content services device(s) 830 receives content such as cable television programming including media information, digital information, and/or other content. Examples of content providers may include any cable or satellite television or radio or Internet content providers. The provided examples are not meant to limit embodiments of this disclosure.

In embodiments, platform 802 may receive control signals from navigation controller 850 having one or more navigation features. The navigation features of controller 850 may be used to interact with user interface 822, for example. In embodiments, navigation controller 850 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 850 may be echoed on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In embodiments, controller 850 may not be a separate component but integrated into platform 802 and/or display 820. Embodiments, however, are not limited to the elements or in the context shown or described herein.

In embodiments, drivers (not shown) may comprise technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 when the platform is turned "off." In addition, chipset 805 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the embodiments of this disclosure.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
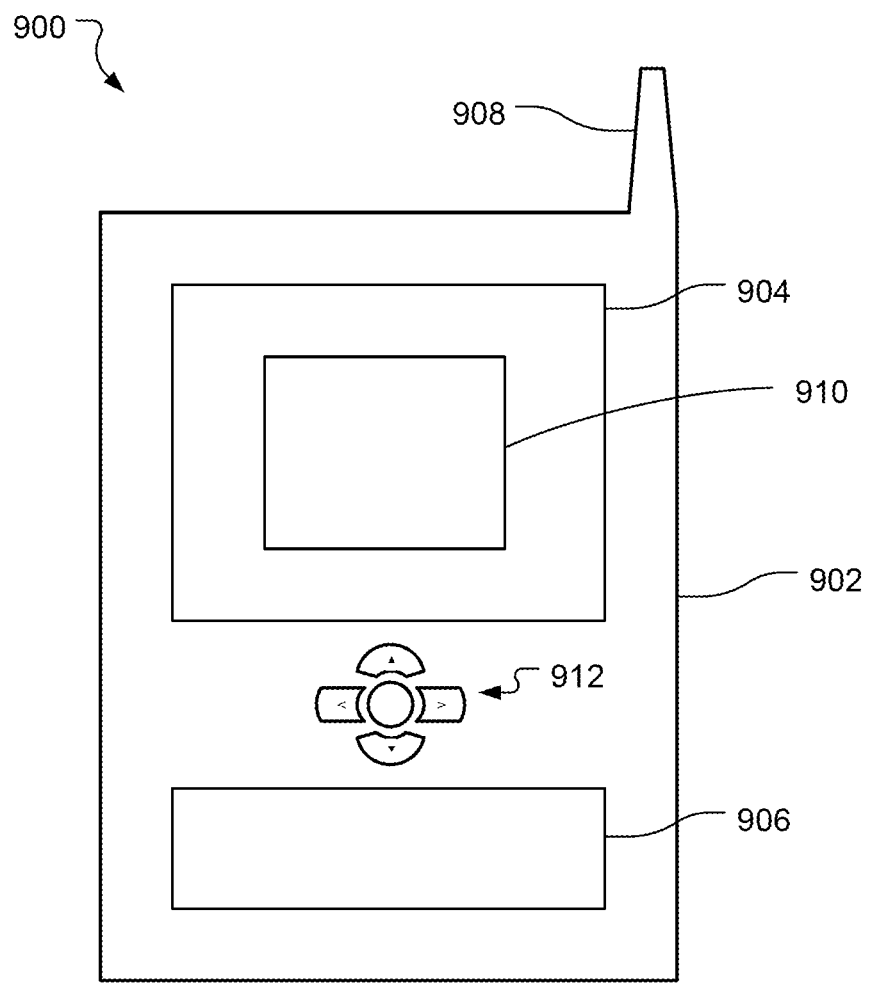
FIG. 9 illustrates an example mobile information device in which an embodiment may be implemented.

As described above, system 800 may be embodied in varying physical styles or form factors. FIG. 9 illustrates embodiments of a small form factor device 900 in which system 800 may be embodied. In embodiments, for example, device 900 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may comprise a housing 902, a display 904, an input/output (I/O) device 906, and an antenna 908. Device 900 also may comprise navigation features 912. Display 904 may comprise any suitable display unit for displaying information 910 appropriate for a mobile computing device. I/O device 906 may comprise any suitable I/O device for entering information into a mobile computing device. Examples for I/O device 906 may include an alphanumeric keyboard, a numeric keypad, a touch pad, input keys, buttons, switches, rocker switches, microphones, speakers, voice recognition devices and software, and so forth. Information also may be entered into device 900 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Technologies disclosed herein manage the routing and maintenance of uncompressed data of variable length in a cache fabric. The solutions provided herein allow compression and decompression of data at the memory interface rather than at individual processing blocks, efficiently saving space and optimizing power needs while benefitting from the advantages of compressed data in the memory. In embodiments, at least one compressor-decompressor and a cache fabric of cache banks are configured to manage and track (via finite state machines, fixed function blocks, software, etc.) uncompressed data of variable length for data requests by at least one processing element to the memory. The particular examples and scenarios used in this document are for ease of understanding and are not to be limiting. For example, there may be a plurality of compressors and decompressors as part of a compressor-decompressor unit, or may even be a plurality of compressor-decompressor units each having one or more compressors and decompressors. As another example, the configuration of cache banks and nodes shown herein is just one example implementation. Many other configurations may also be used. In addition, features described herein may be used in many other contexts, as would be understood by one of ordinary skill in the art. For example, concepts described herein may be applied to any parallel processing system or unit, such as, but not to be limited to, a central processing unit (CPU), a graphics processing unit (GPU), etc.

There are various advantages of using the technologies described herein. The technologies described herein provide distributed solutions that minimize die size and power needs while still benefiting from the use of compressed data in the memory. Many other advantages may also be contemplated.

The following examples pertain to further embodiments.

Example 1 may include a computing system, comprising: at least one processing element; a memory communicatively coupled to the at least one processing element; at least one compressor-decompressor communicatively coupled to the at least one processing element, and communicatively coupled to the memory through a memory interface; and a cache fabric comprising a plurality of distributed cache banks communicatively coupled to each other, to the at least one processing element, and to the at least one compressor-decompressor via a plurality of nodes, wherein the at least one compressor-decompressor and the cache fabric are configured to manage and track uncompressed data of variable length for data requests by the at least one processing element to the memory.

Example 2 may include the subject matter of Example 1, wherein, if there is a cache miss of one or more bytes of data desired by a requesting processing element of the at least one processing element: the requesting processing element is configured to generate a LOAD request to the memory for the desired one or more bytes of data; and the at least one compressor-decompressor is configured to detect the LOAD request, decompress contents provided from the memory, identify the desired one or more bytes of data from the contents, provide the desired one or more bytes of data to a cache bank associated with the requesting processing element, and distribute remaining complementary bytes of data from the contents to one or more other cache banks of the cache fabric.

Example 3 may include the subject matter of Example 2, wherein the distributing of the remaining complementary bytes of data includes distributing one or more of the one or more remaining complementary bytes of data to one or more other cache banks as bandwidth of the cache banks allows.

Example 4 may include the subject matter of Example 2 or Example 3, wherein a cache bank containing one or more complementary bytes of data has a lower priority than cache banks that do not contain complementary bytes of data in that the one or more complementary bytes of data in the lower priority cache bank can be replaced as needed by future requested bytes of data.

Example 5 may include the subject matter of Example 4, wherein the future requested bytes of data are for an actual data request.

Example 6 may include the subject matter of Example 4, wherein the future requested bytes of data are for a just-in-time data request.

Example 7 may include the subject matter of any one of Examples 2-6, wherein, if there is a subsequent request to the memory for one or more complementary bytes of data before filling of a cache bank handling the one or more complementary bytes of data is complete: the cache bank handling the one or more requested complementary bytes of data is configured to detect and fill the subsequent request for the one or more complementary bytes of data; and the at least one compressor-decompressor is configured to cancel the subsequent request to memory to lessen traffic on the memory interface.

Example 8 may include the subject matter of any one of Examples 1-7, wherein a processing element of the at least one processing element is configured to write out one or more bytes of uncompressed data to the cache fabric; wherein the cache fabric is configured to distribute the one or more bytes of uncompressed data as modified content; and wherein, if any of the modified content is written out from the cache fabric, the at least one compressor-decompressor is configured to detect that modified content is being written out; hold the detected modified content; conduct a search of the cache fabric for complementary content to the modified content; and if all complementary content is found, consolidate and compress the modified and complementary content and write the compressed content to the memory.

Example 9 may include the subject matter of Example 8, wherein the at least one compressor-decompressor is configured to, if not all of the complementary content is found when the modified content is written out: read, from the memory, previously stored compressed content that is associated with the modified content; decompress the associated content; merge and compress the modified content, the found complementary content, and the associated content; and write the merged and compressed content to the memory.

Example 10 may include the subject matter of any one of Examples 1-7, wherein a processing element of the at least one processing element is configured to write out one or more bytes of uncompressed data, bypassing the cache fabric; and wherein the at least one compressor-decompressor is configured to detect that the one or more bytes of uncompressed data are being written out; compress the uncompressed data; write the compressed data to the memory; and provide the uncompressed data to the cache fabric for future data requests.

In Example 11, any one of Examples 1-10 may optionally include a communication interface communicatively coupled to the at least one processing element and a network; a user interface including a navigation device and display, the user interface communicatively coupled to the at least one processing element; and storage that stores application logic, the storage communicatively coupled to the at least one processing element, wherein the at least one processing element is configured to load and execute the application logic, wherein the execution of the application logic includes presenting graphics via the user interface.

Example 12 may include at least one computer program product, including at least one computer readable medium having computer program logic stored therein, the computer program logic including logic to cause a compressor-decompressor to, if there is a cache miss of one or more bytes of data desired by a requesting processing element: detect a LOAD request to a memory for the desired one or more bytes of data; decompress contents provided from the memory in response to the LOAD request; identify the desired one or more bytes of data from the contents; provide the desired one or more bytes of data to a cache bank associated with the requesting processing element, the cache bank being part of a cache fabric of a plurality of cache banks communicatively coupled to each other, to a plurality of processing elements, and to the compressor-decompressor via a plurality of nodes; and distribute remaining complementary bytes of data from the contents to one or more other cache banks of the cache fabric.

Example 13 may include the subject matter of Example 12, wherein the computer program logic further includes logic to cause the compressor-decompressor to, if there is a subsequent request to the memory for one or more complementary bytes of data before filling of a cache bank handling the one or more complementary bytes of data is complete, cancel the subsequent request to memory to lessen traffic on a memory interface while the cache bank handling the one or more requested complementary bytes of data detects and fills the subsequent request.

Example 14 may include at least one computer program product, including at least one computer readable medium having computer program logic stored therein, the computer program logic including logic to cause a compressor-decompressor to: detect that uncompressed modified content is being written out from one or more cache banks of a cache fabric, the cache fabric including a plurality of cache banks communicatively coupled to each other, to a plurality of processing elements, and to the compressor-decompressor via a plurality of nodes; hold the detected modified content; conduct a search of the cache fabric for complementary content to the modified content; and if all complementary content is found, consolidate and compress the modified and complementary content and write the compressed content to a memory.

Example 15 may include the subject matter of Example 14, wherein the computer program logic further includes logic to cause the compressor-decompressor to, if not all of the complementary content is found: read, from the memory, previously stored compressed content that is associated with the modified content; decompress the associated content; merge and compress the modified content, the found complementary content, and the associated content; and write the merged and compressed content to the memory.

Example 16 may include at least one computer program product, including at least one computer readable medium having computer program logic stored therein, the computer program logic including logic to cause a compressor-decompressor to: detect that one or more bytes of uncompressed data are being written out; compress the uncompressed data, the uncompressed data having bypassed a cache fabric, the cache fabric including a plurality of cache banks communicatively coupled to each other, to a plurality of processing elements, and to the compressor-decompressor via a plurality of nodes; writing the compressed data to a memory; and providing the uncompressed data to the cache fabric for future data requests.

Example 17 may include an apparatus for processing data, comprising, for when there is a cache miss of one or more bytes of data desired by a requesting processing element: means for detecting a LOAD request to a memory for the desired one or more bytes of data; means for decompressing contents provided from the memory in response to the LOAD request; means for identifying the desired one or more bytes of data from the contents; means for providing the desired one or more bytes of data to a cache bank associated with the requesting processing element, the cache bank being part of a cache fabric of a plurality of cache banks communicatively coupled to each other, to a plurality of processing elements, and to a compressor-decompressor via a plurality of nodes; and means for distributing remaining complementary bytes of data from the contents to one or more other cache banks of the cache fabric.

In Example 18, Example 17 may optionally include, for when there is a subsequent request to the memory for one or more complementary bytes of data before filling of a cache bank handling the one or more complementary bytes of data is complete, means for cancelling the subsequent request to memory to lessen traffic on a memory interface while the cache bank handling the one or more requested complementary bytes of data detects and fills the subsequent request.

Example 19 may include an apparatus for processing data, comprising: means for detecting that uncompressed modified content is being written out from one or more cache banks of a cache fabric, the cache fabric including a plurality of cache banks communicatively coupled to each other, to a plurality of processing elements, and to a compressor-decompressor via a plurality of nodes; means for holding the detected modified content; means for conducting a search of the cache fabric for complementary content to the modified content; and means for, if all complementary content is found, consolidating and compressing the modified and complementary content and writing the compressed content to a memory.

In Example 20, Example 19 may optionally include, for when not all of the complementary content is found: means for reading, from the memory, previously stored compressed content that is associated with the modified content; means for decompressing the associated content; means for merging and compressing the modified content, the found complementary content, and the associated content; and means for writing the merged and compressed content to the memory.

Example 21 may include an apparatus for processing data, comprising: means for detecting that one or more bytes of uncompressed data are being written out; means for compressing the uncompressed data, the uncompressed data having bypassed a cache fabric, the cache fabric including a plurality of cache banks communicatively coupled to each other, to a plurality of processing elements, and to a compressor-decompressor via a plurality of nodes; means for writing the compressed data to a memory; and means for providing the uncompressed data to the cache fabric for future data requests.

Example 22 may include a method of processing data, comprising, if there is a cache miss of one or more bytes of data desired by a requesting processing element: detecting, by a compressor-decompressor, a LOAD request to a memory for the desired one or more bytes of data; decompressing, by the compressor-decompressor, contents provided from the memory in response to the LOAD request; identifying, by the compressor-decompressor, the desired one or more bytes of data from the contents; providing, by the compressor-decompressor, the desired one or more bytes of data to a cache bank associated with the requesting processing element, the cache bank being part of a cache fabric of a plurality of cache banks communicatively coupled to each other, to a plurality of processing elements, and to the compressor-decompressor via a plurality of nodes; and distributing remaining complementary bytes of data from the contents to one or more other cache banks of the cache fabric.

In Example 23, Example 22 may optionally include, if there is a subsequent request to the memory for one or more complementary bytes of data before filling of a cache bank handling the one or more complementary bytes of data is complete, cancelling the subsequent request to memory to lessen traffic on a memory interface while the cache bank handling the one or more requested complementary bytes of data detects and fills the subsequent request.

Example 24 may include at least one machine readable medium comprising a plurality of instructions that in response to being executed on a computing device, cause the computing device to carry out a method according to Example 22 or Example 23.

Example 25 may include an apparatus configured to perform the method of Example 22 or Example 23.

Example 26 may include a computer system to perform the method of Example 22 or Example 23.

Example 27 may include a machine to perform the method of Example 22 or Example 23.

Example 28 may include an apparatus comprising means for performing the method of Example 22 or Example 23.

Example 29 may include a computing device comprising memory and a chipset configured to perform the method of Example 22 or Example 23.

Example 30 may include a method of processing data, comprising: detecting, by a compressor-decompressor, that uncompressed modified content is being written out from one or more cache banks of a cache fabric, the cache fabric including a plurality of cache banks communicatively coupled to each other, to a plurality of processing elements, and to the compressor-decompressor via a plurality of nodes; holding, by the compressor-decompressor, the detected modified content; conducting, by the compressor-decompressor, a search of the cache fabric for complementary content to the modified content; and if all complementary content is found, consolidating and compressing, by the compressor-decompressor, the modified and complementary content and writing the compressed content to a memory.

In Example 31, Example 30 may optionally include, if not all of the complementary content is found: reading, from the memory, previously stored compressed content that is associated with the modified content; decompressing the associated content; merging and compressing the modified content, the found complementary content, and the associated content; and writing the merged and compressed content to the memory.

Example 32 may include at least one machine readable medium comprising a plurality of instructions that in response to being executed on a computing device, cause the computing device to carry out a method according to Example 30 or Example 31.

Example 33 may include an apparatus configured to perform the method of Example 30 or Example 31.

Example 34 may include a computer system to perform the method of Example 30 or Example 31.

Example 35 may include a machine to perform the method of Example 30 or Example 31.

Example 36 may include an apparatus comprising means for performing the method of Example 30 or Example 31.

Example 37 may include a computing device comprising memory and a chipset configured to perform the method of Example 30 or Example 31.

Example 38 may include a method of data processing, comprising: detecting, by a compressor-decompressor, that one or more bytes of uncompressed data are being written out; compressing, by the compressor-decompressor, the uncompressed data, the uncompressed data having bypassed a cache fabric, the cache fabric including a plurality of cache banks communicatively coupled to each other, to a plurality of processing elements, and to the compressor-decompressor via a plurality of nodes; writing, by the compressor-decompressor, the compressed data to a memory; and providing, by the compressor-decompressor, the uncompressed data to the cache fabric for future data requests.

Example 39 may include at least one machine readable medium comprising a plurality of instructions that in response to being executed on a computing device, cause the computing device to carry out a method according to Example 38.

Example 40 may include an apparatus configured to perform the method of Example 38.

Example 41 may include a computer system to perform the method of Example 38.

Example 42 may include a machine to perform the method of Example 38.

Example 43 may include an apparatus comprising means for performing the method of Example 38.

Example 44 may include a computing device comprising memory and a chipset configured to perform the method of Example 38.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the scope of the methods and systems disclosed herein. Thus, the breadth and scope of the claims should not be limited by any of the exemplary embodiments disclosed herein.

As used in this application and in the claims, a list of items joined by the term "one or more of" can mean any combination of the listed terms. For example, the phrases "one or more of A, B or C" and "one or more of A, B, and C" can mean A; B; C; A and B; A and C; B and C; or A, B and C.

What is claimed is:
1. An apparatus, comprising:
multiple processing nodes, each including one or more processing elements;
a cache fabric that includes multiple cache banks distributed amongst the processing nodes and communication infrastructure to communicate amongst the processing nodes; and
a compressor-decompressor to receive and decompress a first compressed block of data from memory to provide uncompressed data requested by a first one of the processing nodes and uncompressed complementary data;
wherein of compressor-decompressor is configured to load the uncompressed data requested by the first processing node to a first cache bank of the first processing node, selectively load the uncompressed complementary data to one or more other cache banks of the cache fabric, and manage and track uncompressed data of variable lengths across the cache fabric.

2. The apparatus of claim 1, wherein the compressor-decompressor is further configured to:
selectively load the uncompressed complementary data to the one or more other cache banks based on bandwidths of the cache banks.

3. The apparatus of claim 1, wherein the compressor-decompressor is further configured to:
assign a first priority to a cache bank that contains uncompressed data requested by one or more of the processing nodes;
assign a second priority to a cache bank that contains uncompressed complementary data, wherein the second priority is lower than the first priority; and
selectively load the uncompressed data requested by the first processing node to a cache bank of the first processing node that has been assigned the second priority; based on a bandwidth of the cache fabric.

4. The apparatus of claim 1, wherein the compressor-decompressor is further configured to:
place the uncompressed complementary data in a queue of a second cache bank from which to load the uncompressed complementary data to the second cache bank;
detect a request for the complementary data from one of the processing nodes, subsequent to the uncompressed complementary data being placed in the queue and prior to the uncompressed complementary data being loaded to the second cache bank; and
fulfill the request with the uncompressed complementary data placed in the queue of the second cache bank.

5. The apparatus of claim 1, wherein the compressor-decompressor is configured to:
detect that modified content is to be written out from the cache fabric by one or more of the processing elements;
search the cache fabric for complementary content to the modified content; and
consolidate and compress the modified content and the complementary content to the modified content to provide a second compressed block of data, and write the second compressed block of data to the memory, if all complementary content to the modified content is found.

6. The apparatus of claim 5, wherein the compressor-decompressor is further configured to, if less than all complementary content to the modified content is found:
read, from the memory, previously stored compressed content that is associated with the modified content;
decompress the associated content;
merge and compress the modified content, the found complementary content, and the associated content; and
write the merged and compressed content to the memory.

7. The apparatus of claim 1, wherein one or more of the processing elements is configured to write out one or more bytes of uncompressed data, bypassing the cache fabric, and wherein the one or more of the compressor-decompressor and the cache fabric is configured to:
detect that the one or more bytes of uncompressed data are being written out;
compress the uncompressed data;
write the compressed data to the memory; and
provide the uncompressed data to the cache fabric for future data requests.

8. The apparatus of claim 1, further comprising:
a communication interface communicatively coupled to the processing elements and a network;
a user interface including a navigation device and display, the user interface communicatively coupled to the processing elements; and
a non-transitory computer readable storage medium encoded with a computer program that includes instructions to cause the processor elements to present graphics via the user interface.

9. A non-transitory computer readable medium encoded with a computer program that includes instructions to cause a compressor-decompressor to, if there is a cache miss of one or more bytes of data desired by a requesting processing element:
detect a LOAD request to a memory for the desired one or more bytes of data;
decompress contents provided from the memory in response to the LOAD request;
identify the desired one or more bytes of data from the contents;
provide the desired one or more bytes of data to a cache bank associated with the requesting processing element, the cache bank being part of a cache fabric of a plurality of cache banks communicatively coupled to each other, to a plurality of processing elements, and to the compressor-decompressor via a plurality of nodes; and
distribute remaining complementary bytes of data from the contents to one or more other cache banks of the cache fabric.

10. The non-transitory computer readable medium of claim 9, further including instructions to cause the compressor-decompressor to, if there is a subsequent request to the memory for one or more complementary bytes of data before filling of a cache bank handling the one or more complementary bytes of data is complete, cancel the subsequent request to memory to lessen traffic on a memory interface while the cache bank handling the one or more requested complementary bytes of data detects and fills the subsequent request.

11. The non-transitory computer readable medium of claim 9, further including instructions to cause the compressor-decompressor to:
detect that uncompressed modified content is being written out from one or more cache banks of the cache fabric;
hold the detected modified content;
conduct a search of the cache fabric for complementary content to the modified content; and
if all complementary content to the modified content is found, consolidate and compress the modified and complementary content and write the compressed content to the memory.

12. The non-transitory computer readable medium of claim 11, further including instructions to cause the compressor-decompressor to, if not all of the complementary content to the modified content is found:
read, from the memory, previously stored compressed content that is associated with the modified content;
decompress the associated content;
merge and compress the modified content, the found complementary content, and the associated previously stored content; and
write the merged and compressed content to the memory.

13. The non-transitory computer readable medium of claim 9, further including instructions to cause the compressor-decompressor to:
detect that one or more bytes of uncompressed data are being written out;

compress the uncompressed data, the uncompressed data having bypassed the cache fabric;

write the compressed data to the memory; and provide the uncompressed data to the cache fabric for future data requests.

14. A method of processing data, comprising, if there is a cache miss of one or more bytes of data desired by a requesting processing element:

detecting, by a compressor-decompressor, a LOAD request to a memory for the desired one or more bytes of data;

decompressing, by the compressor-decompressor, contents provided from the memory in response to the LOAD request;

identifying, by the compressor-decompressor, the desired one or more bytes of data from the contents;

providing, by the compressor-decompressor, the desired one or more bytes of data to a cache bank associated with the requesting processing element, the cache bank being part of a cache fabric of a plurality of cache banks communicatively coupled to each other, to a plurality of processing elements, and to the compressor-decompressor via a plurality of nodes; and distributing, by the compressor-decompressor, remaining complementary bytes of data from the contents to one or more other cache banks of the cache fabric.

15. The method of claim 14, further comprising, if there is a subsequent request to the memory for one or more complementary bytes of data before filling of a cache bank handling the one or more complementary bytes of data is complete, cancelling the subsequent request to memory to lessen traffic on a memory interface while the cache bank handling the one or more requested complementary bytes of data detects and fills the subsequent request.

16. The method of claim 14, further comprising:

detecting that uncompressed modified content is being written out from one or more cache banks of the cache fabric;

holding the detected modified content;

conducting a search of the cache fabric for complementary content to the modified content; and if all complementary content to the modified content is found, consolidating and compressing the modified and complementary content and writing the compressed content to a memory.

17. The method of claim 16, further comprising, if not all of the complementary content to the modified content is found:

reading, from the memory, previously stored compressed content that is associated with the modified content;

decompressing the associated content;

merging and compressing the modified content, the found complementary content, and the associated content; and writing the merged and compressed content to the memory.

18. The method of claim 14, further comprising:

detecting that one or more bytes of uncompressed data are being written out;

compressing the uncompressed data, the uncompressed data having bypassed the cache fabric;

writing the compressed data to the memory; and providing the uncompressed data to the cache fabric for future data requests.

* * * * *

UNITED STATES PATENT AND TRADEMARK OFFICE
CERTIFICATE OF CORRECTION

| | | |
|---|---|---|
| PATENT NO. | : 9,612,833 B2 | Page 1 of 1 |
| APPLICATION NO. | : 14/193550 | |
| DATED | : April 4, 2017 | |
| INVENTOR(S) | : Altug Koker et al. | |

It is certified that error appears in the above-identified patent and that said Letters Patent is hereby corrected as shown below:

In the Claims

In Column 16, Line 63, in Claim 1, delete "of" and insert -- the --, therefor.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*